Sept. 29, 1953   J. A. J. BENNETT ET AL   2,653,778
ROTARY-WING AIRCRAFT

Filed Nov. 21, 1950   11 Sheets-Sheet 1

Inventors
JAMES ALLAN JAMIESON BENNETT,
ARCHIBALD GRAHAM FORSYTH,
By Robert M Carron
Attorney Sept. 29, 1953 J. A. J. BENNETT ET AL 2,653,778
ROTARY-WING AIRCRAFT
Filed Nov. 21, 1950 11 Sheets-Sheet 6

Inventors
JAMES ALLAN JAMIESON BENNETT,
ARCHIBALD GRAHAM FORSYTH,
By
Robert H Cairo
Attorney Sept. 29, 1953 J. A. J. BENNETT ET AL 2,653,778
ROTARY-WING AIRCRAFT
Filed Nov. 21, 1950 11 Sheets-Sheet 9

Inventors
JAMES ALLAN JAMIESON BENNETT,
ARCHIBALD GRAHAM FORSYTH,
By
Robert N Laurey
Attorney Sept. 29, 1953  J. A. J. BENNETT ET AL  2,653,778
ROTARY-WING AIRCRAFT
Filed Nov. 21, 1950  11 Sheets-Sheet 10

Inventors
JAMES ALLAN JAMIESON BENNETT,
ARCHIBALD GRAHAM FORSYTH,
By Robert B Lawn
Attorney

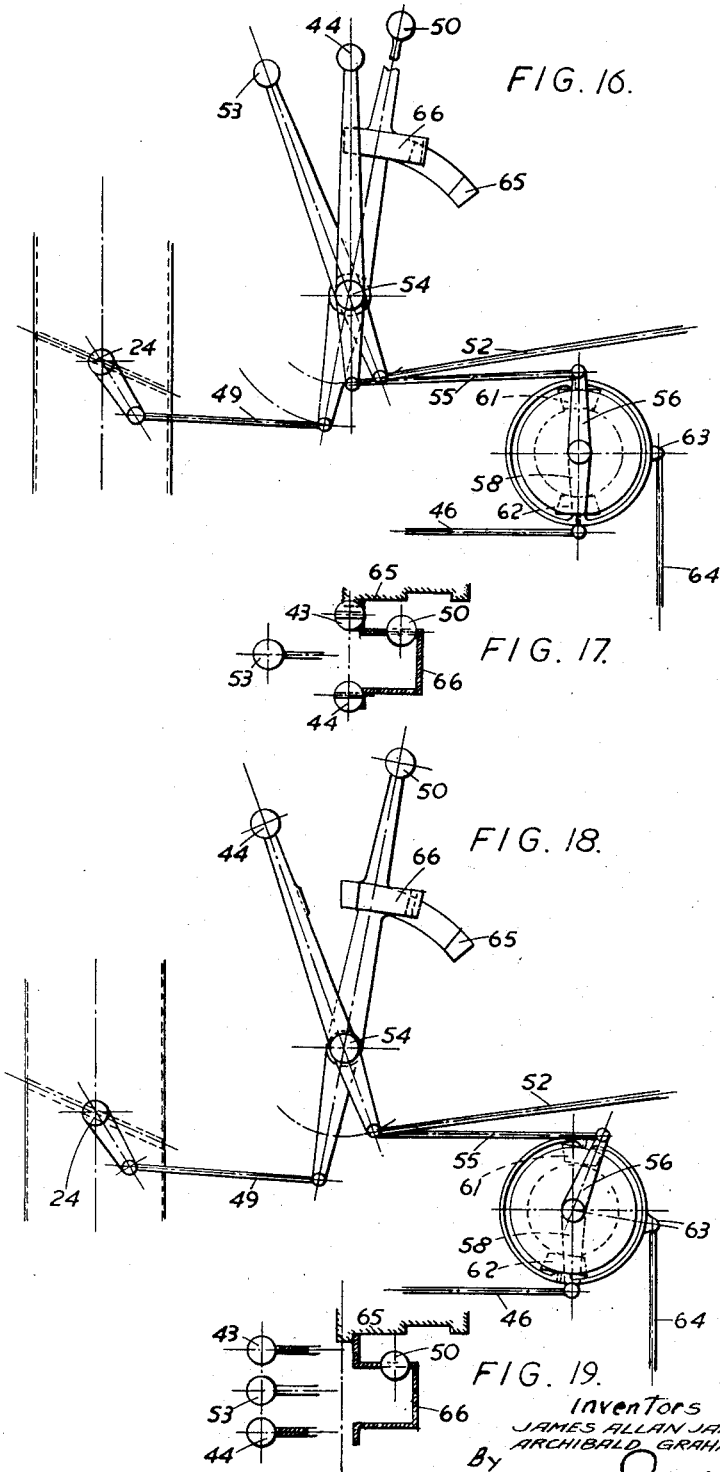

UNITED STATES PATENT OFFICE 2,653,778

ROTARY-WING AIRCRAFT

James Allan Jamieson Bennett, Gerrards Cross, and Archibald Graham Forsyth, Cheam, England, assignors to The Fairey Aviation Company Limited, Hayes, England Application November 21, 1950, Serial No. 196,766
In Great Britain September 7, 1949

10 Claims. (Cl. 244—6)

This invention relates to rotary wing aircraft, and has for an object the simplification and reduction or elimination of mechanical transmission and a simplification of control operation in flight.

Helicopter rotors in the past have been limited in size to a diameter of about 50 ft., and large helicopters have necessitated the employment of two or more rotors, despite the complexity introduced thereby. The rotor torque in both single rotor and multi-rotor helicopters has required the simultaneous operation of four controls, necessitating a high degree of concentrated attention by the pilot. Heavy transmissions have resulted in high maintenance costs and uneconomic useful load.

In this specification the term "rotor," where it is employed, signifies a number of rotatable blades constituting a sustaining rotary wing system, and is not intended to refer to the rotor of a turbine. Similarly, the term "blade" signifies one of the members of such a system, and is not intended to refer to the blade of a turbine.

According to the invention the proposed rotary wing aircraft has two or more independent turbo-compressor-driven propellers arranged to be operable for forward propulsion and a sustaining rotor arranged to be powered by jet units on the tips of the rotary wings, the rotor hub being provided with a distributor fed from any or all of the turbo-compressor units and serving all the jet units of the rotor.

According also to the invention the proposed rotor craft comprises a sustaining rotor, two outboard propellers, and two power units in which there is no mechanical transmission to the rotor, and no mechanical interconnection between the two power units, the said rotorcraft being capable of operating either as a helicopter (in which case the rotor is powered by jets on the tips of the rotary wings and the propellers are at fine pitch) or as a gyroplane (in which case the rotor is auto-rotative and the propellers are powered separately by power units) or said rotorcraft may be flown employing the gyrodyne principle of distributing the power between rotor and propellers.

According further to the invention the proposed rotary wing aircraft comprises a sustaining rotor, two propellers for forward propulsion and two power units mounted at the outboard ends of stub wings, there being no mechanical power transmission mechanism between the power units and the rotor and no mechanical interconnection between the power units themselves, each of the power units including a turbo-driven air compressor having valved-connection with jets mounted at the tips of the rotary wings, the valved connections being arranged to enable the output of the air compressors to be divisible in variable ratio between the jets at the tips of the rotary wings and the turbines, whereby a sufficient proportion of said output may be delivered to the jets at the tips of the rotary wings to drive the rotor for vertical flight, or the whole of said output may be delivered to the turbines to enable the propellers to be employed for forward flight, the rotor then being auto-rotative, or said output may be distributed in any other desired ratio between the jets at the tips of the rotary wings and the turbines.

Throttle valves in the connections between the compressors and the jets at the tips of the rotary wings may cooperate with constant speed governors, one for each power unit, so that as the power falls off at said jets it is transferred to the propellers.

The rotor craft may comprise a sustaining rotor and two independent outboard propellers, whereby control of the aircraft in yaw, independently of forward speed, may be obtained by differential control of the pitch of the propellers, or, if constant speed units are provided, by differential throttle control of the separate power plants driving the propellers.

The rotorcraft may comprise a sustaining rotor and two independent outboard propellers driven by separate power units whereby, in the event of failure of either power unit, the pitch of the operative propeller may be reduced to give substantially zero thrust and the operative unit may be utilized to provide air flow for the operation of jets at the tips of the rotary wings.

The constant speed governors may be connected with variable pitch control mechanism for the propeller blades so arranged that when the jets at the tips of the rotary wings are in use for vertical flight the propeller blades are set at substantially zero pitch and, when the flow to said jets is cut off gradually and the flow to the turbines is increased, the pitch of the propeller blades is increased correspondingly until the desired change of flow distribution is attained.

The hub of the rotor may be provided with a distributor arranged to be fed from either or both of the turbo-compressors and serving all the jets of the rotor.

Embodiments of the invention will be described with reference to the accompanying drawings, in which.

Figure 1:
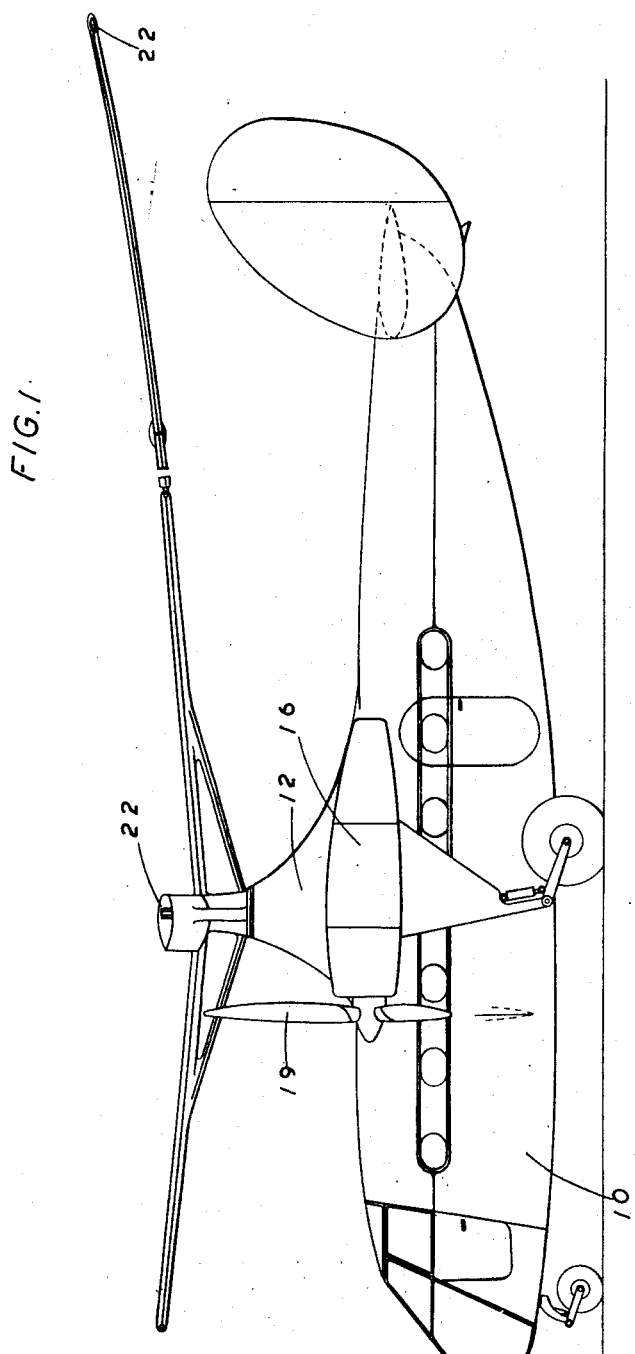
Figure 1 is a diagrammatic side elevation of a two-engined rotary wing aircraft.
Figure 2:
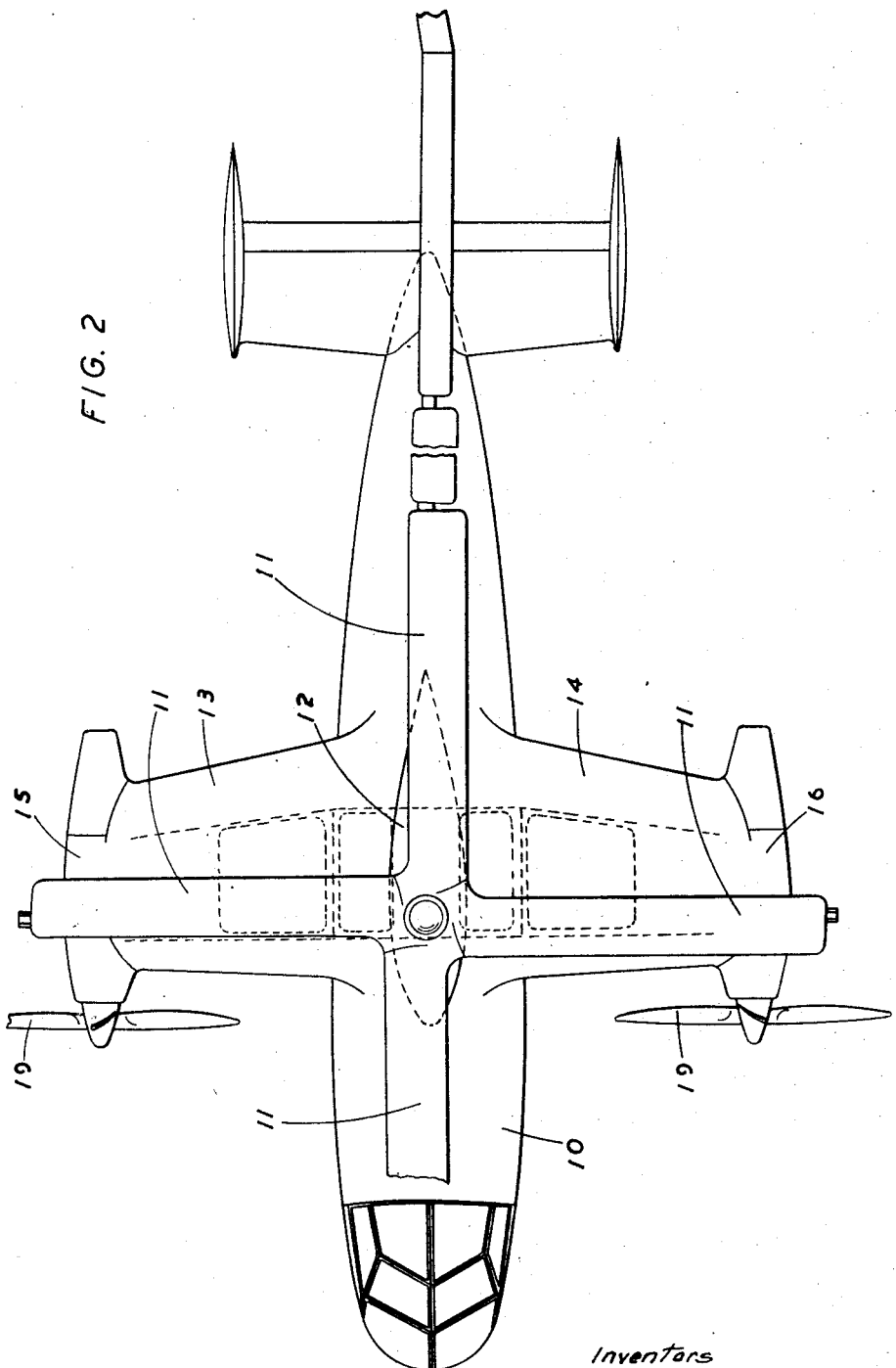
Figure 2 is a diagrammatic plan of the aircraft.
Figure 3:
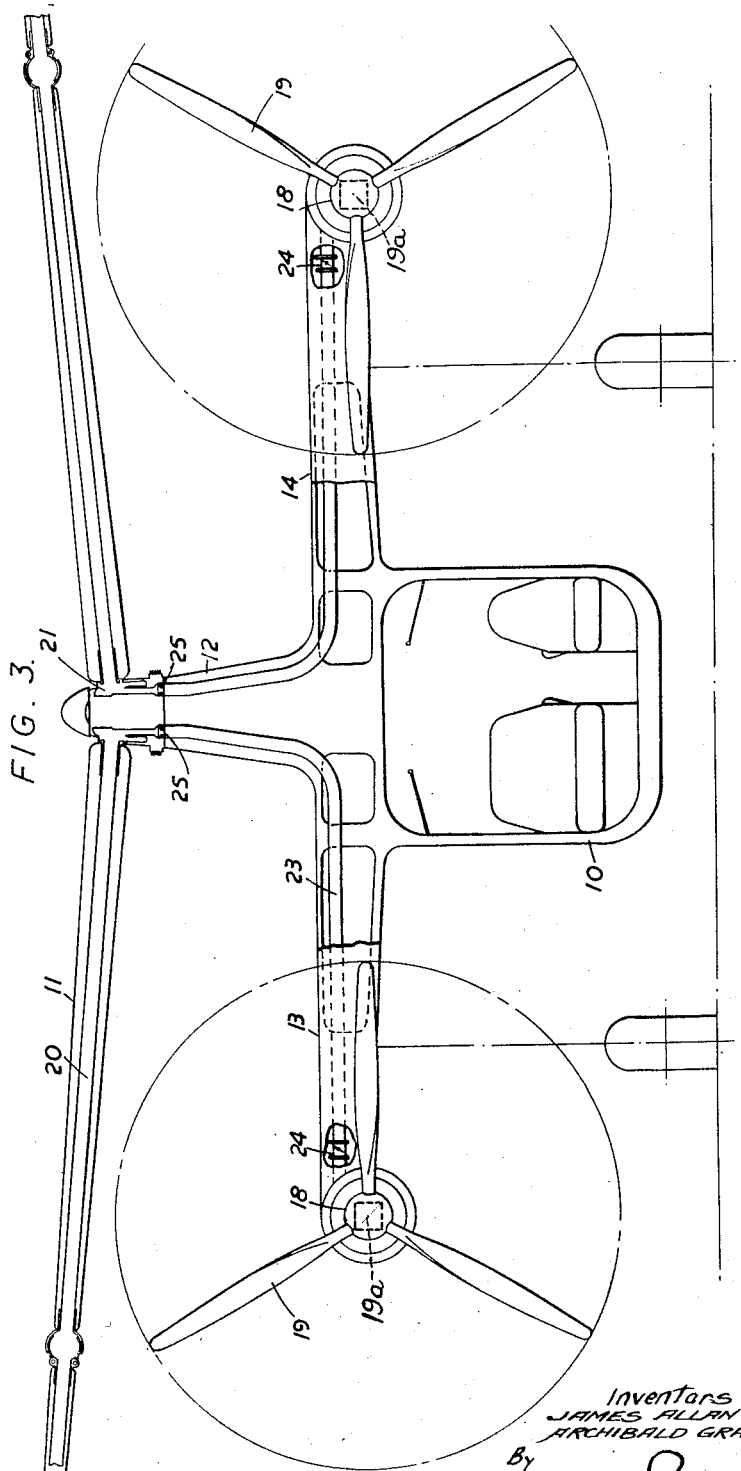
Figure 4:
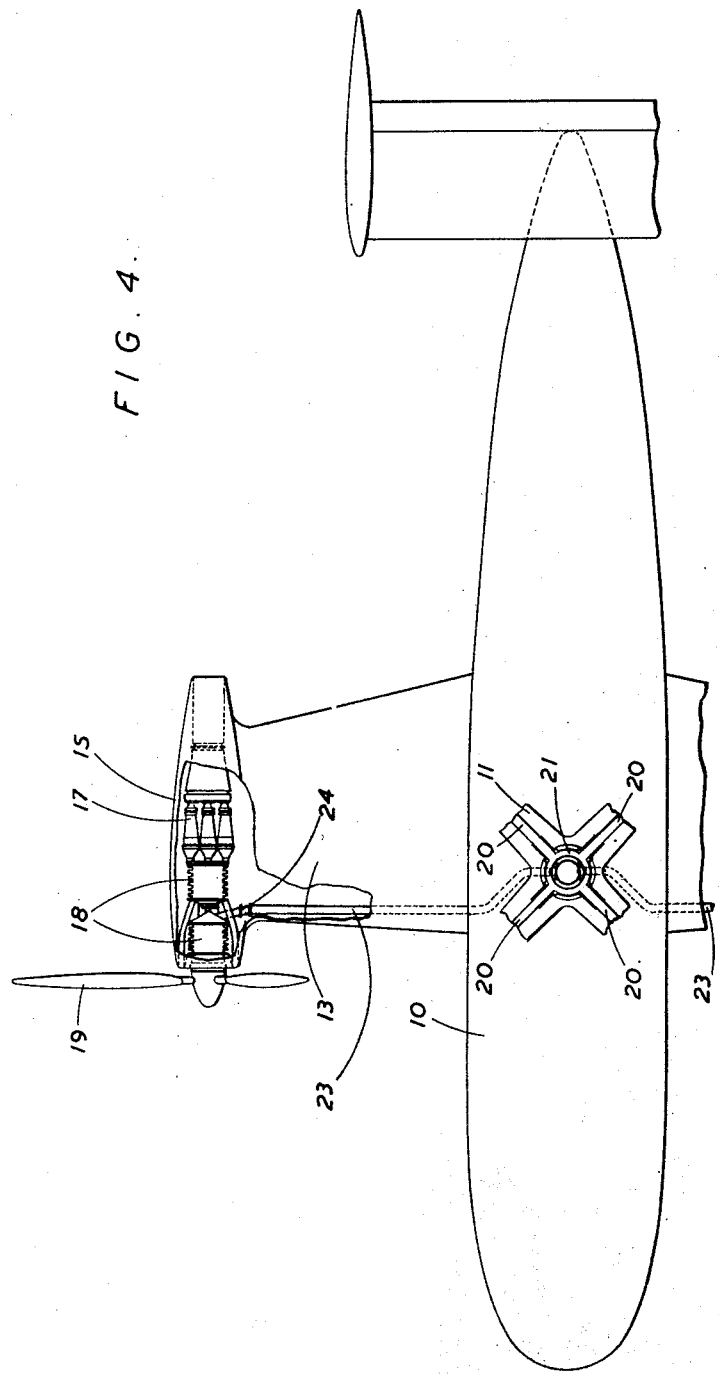
Figure 5:
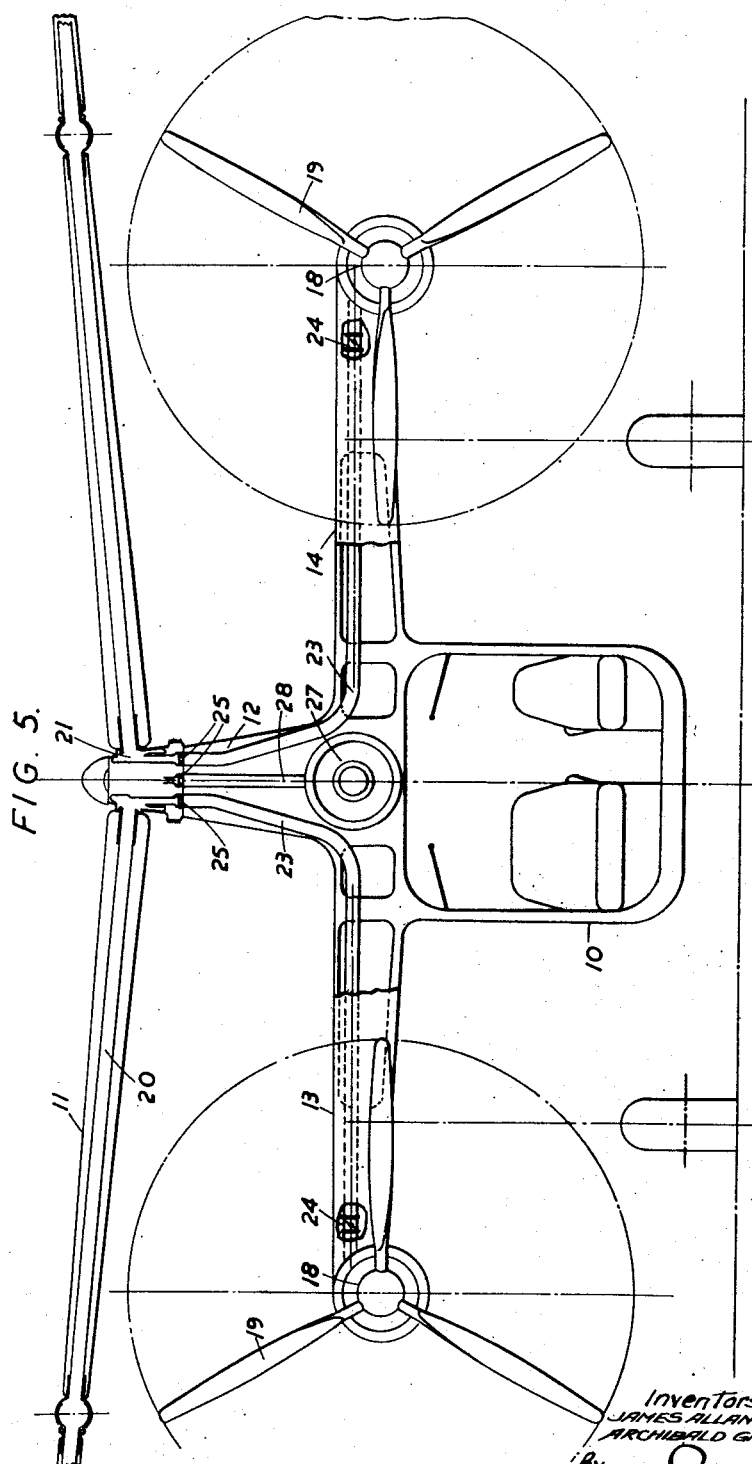
Figure 6:
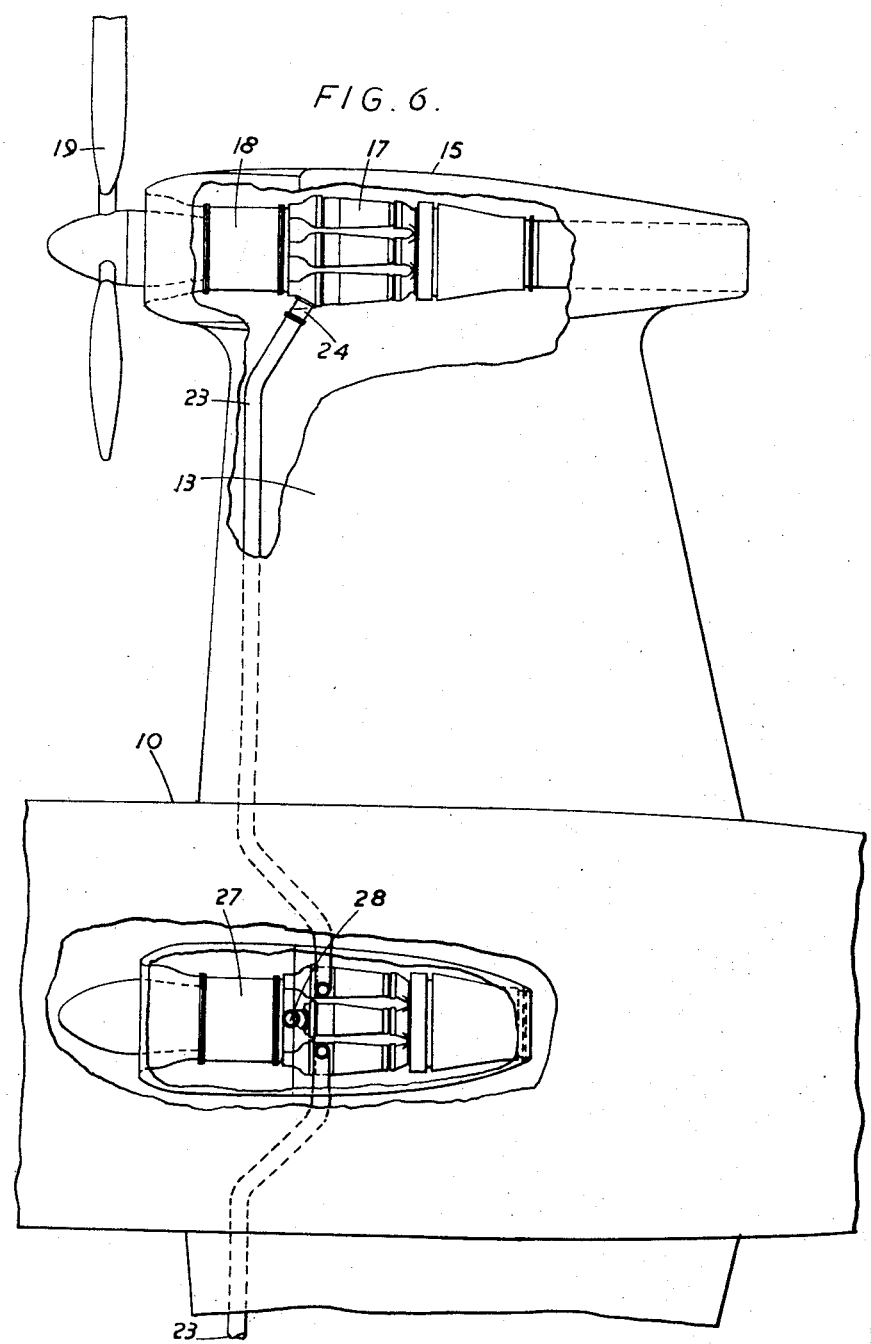
Figure 7:
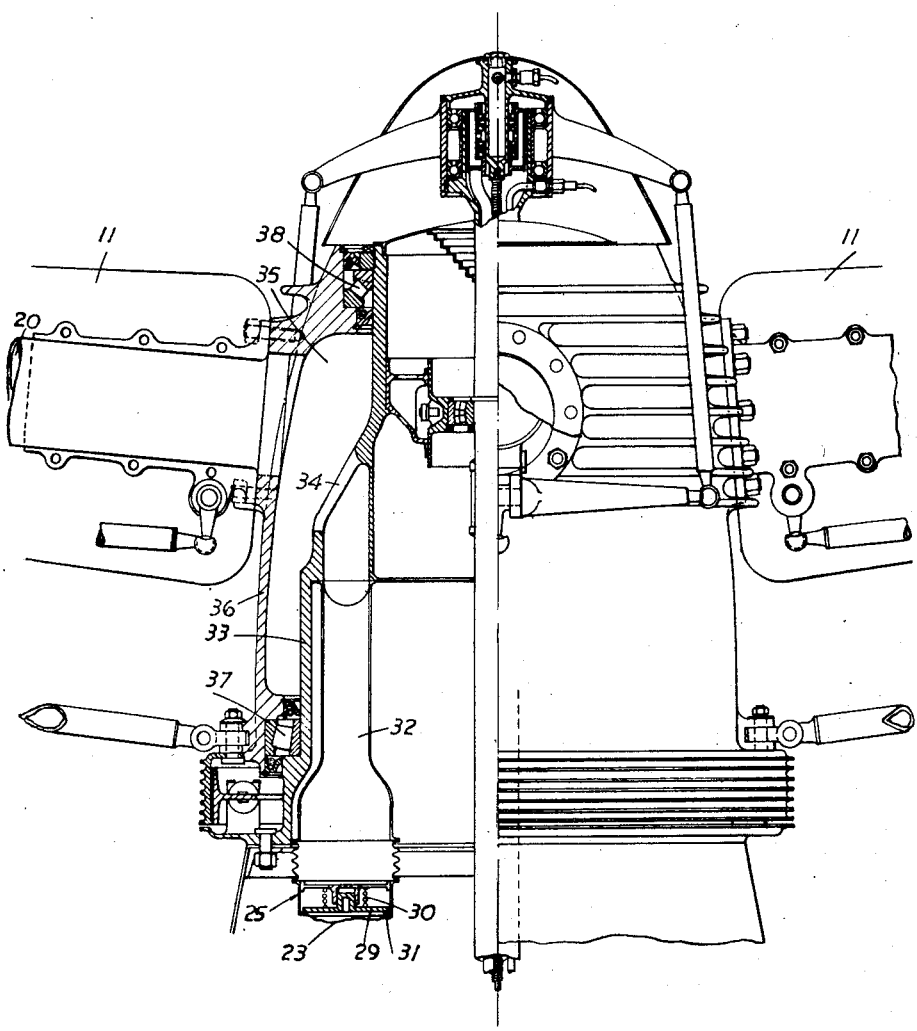
Figure 8:
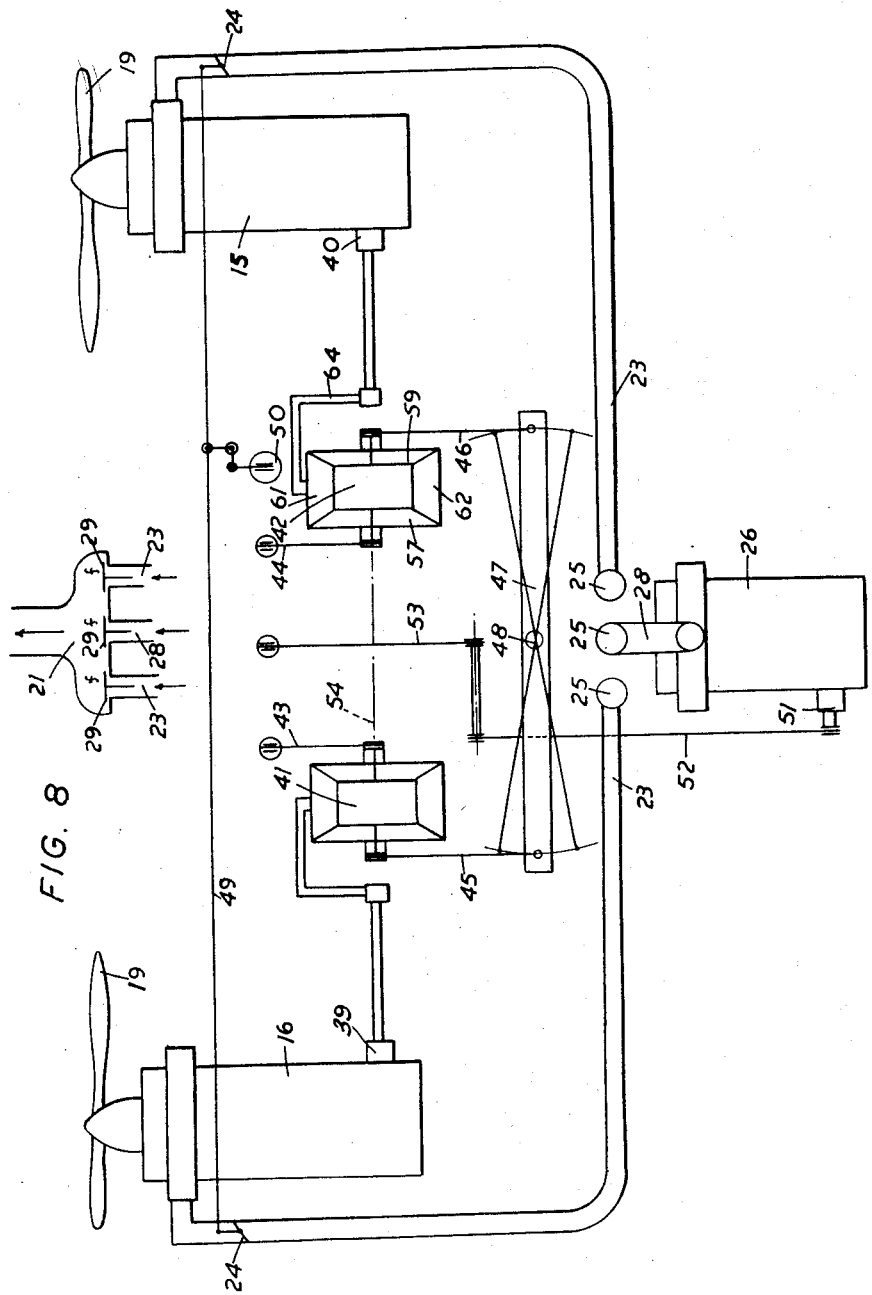
Figure 9:
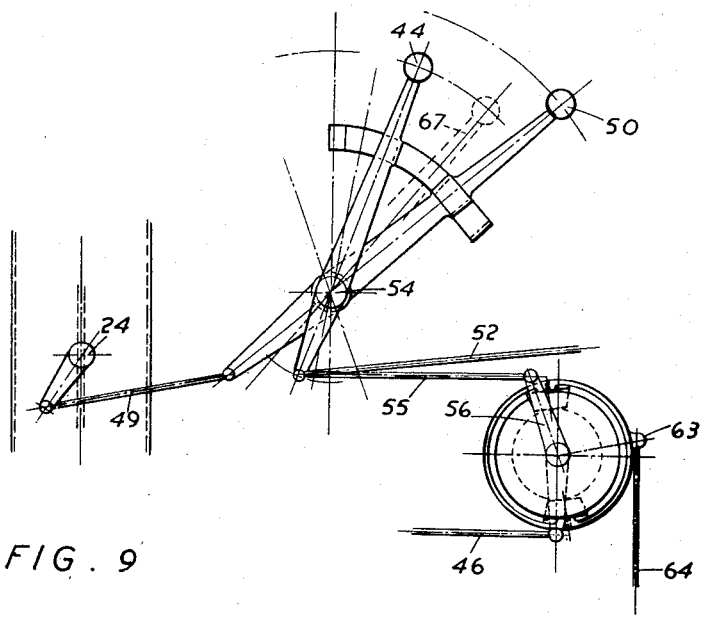
Figure 10:
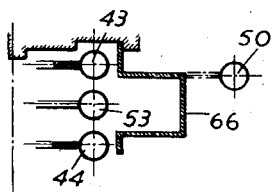
Figure 11:
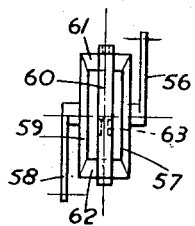
Figure 12:
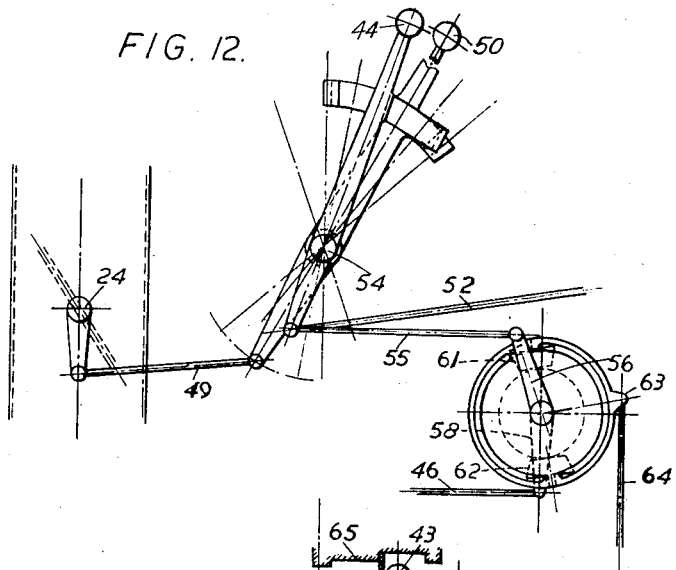
Figure 13:
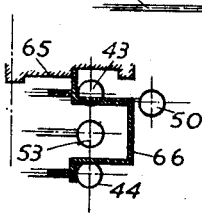

Figure 3 is a diagrammatic front elevation, partly broken away, of the aircraft, Figure 4 is a fragmentary diagrammatic plan of an engine and the rotor head, showing connections therebetween, Figure 5 is a diagrammatic front elevation of a three-engined rotary wing aircraft, Figure 6 is a fragmentary diagrammatic plan of the starboard and centre engines, showing connections therebetween, Figure 7 is a side elevation, partly sectioned, of the rotor head, on an enlarged scale, Figure 8 is a diagrammatic representation of the pilot's controls for the three-engined installation, Figure 9 is a diagrammatic side elevation of the pilot's control levers set for hovering flight, Figure 10 is a diagrammatic plan of the levers in this position, showing the gating thereof, Figure 11 is a fragmentary front elevation of a differential for an outboard engine control lever, Figures 12 and 13 are views corresponding with Figures 9 and 10, but with the control levers set for the start of the change from hovering to forward flight, Figures 14 and 15, and 16 and 17, are corresponding views showing the control levers set for further stages in the change from hovering to forward flight, and Figures 18 and 19 are corresponding views showing the control levers with all controls closed.

Referring to Figures 1 to 4, which show a two-engined aircraft, the aircraft 10 has a large diameter sustaining rotor 11 mounted on a pylon 12 located in the plane of symmetry, with stub wings 13, 14 extending on each side of the pylon 12. At the outboard ends of the stub wings there are power units 15, 16, each comprising a turbine 17 driving an air compressor 18 and a tractor variable pitch propeller 19.

The blades of the rotor 11 are formed with internal ducts 20 fed from a distributor 21 in the pylon 12, and provided at their outer ends with jet units 22 arranged to discharge a flow tangentially for driving the rotor 11. Fuel supply and ignition services (not shown) are led from the pylon 12 through the distributor 21 to the ends of the rotary wings.

From each compressor 18 there extends a duct 23 for compressed air connected with the input side of the distributor 21 and provided with an air valve 24 and a constant speed governor 19a associated with the power unit 15 or 16.

Non-return valves 25 are provided where the ducts 23 communicate with the distributor 21, so that failure of one of the compressors does not affect the delivery of the other to the rotor 11.

For vertical flight, the propellers 19 are set at substantially zero pitch, and the air valves 24 permitting air to be fed to the distributor 21 are opened, so that the necessary amount of air is tapped from the compressors 18.

When, for forward flight, the sustaining rotor 11 is to be changed over to the autorotative condition, the controls (not shown) are arranged so that as the air supply is cut off from the jet units 22 it is transferred to the combustion chambers of the turbines 17, thereby raising the power to be absorbed by the propellers 19. When the air valves 24 are fully closed each power plant delivers the whole of its output-power to the associated propeller 19; the change-over is achieved by the air valves 24 in the air ducts 23 cooperating with the constant speed governors 19a. As the air valves 24 are gradually closed, the power applied to the propellers 19 is increased, and the constant speed units increase the pitch of the propellers 19 until the desired forward speed is attained.

Figures 5 to 19 show a three-engined aircraft, in more detail than has heretofore been described, which may broadly be considered as the same as the two-engined aircraft, but with a third engine in the fuselage. Like reference numerals are used for like parts.

As will be seen from Figures 5 and 6, the third turbine 26 is located at the foot of the pylon 12 and drives a compressor 27, which delivers air through a duct 28 first rearwardly and then upwardly through the pylon 12 to the distributor 21 through a non-return valve 25. Means (not shown) are provided for tapping either of the ducts 23 from the outboard engines to feed the combustion chambers of the turbine 26. In this way instantaneous starting of the turbine 26 may be obtained during forward flight with autorotation, when the turbine 26 is normally at rest.

Figure 7 shows in greater detail the construction of the rotor head. The ducts 23, 28 lead to the non-return valves 25, each of which has a valve member 29 urged by a spring 30 against a seating 31. Short pipes 32 lead the air up through the rotor head body 33 to openings 34 through which it passes to a plenum chamber 35 within the rotor head casing 36. This casing carries the blades of the rotary wing 11 and is rotatable on bearings such as 37, 38 about the rotor head body 33. Pressure air thus passes from the ducts 23 or 28 through the valves 25, pipes 32, and openings 34 to the plenum chamber 35 and thence to the ducts 20. If any of the compressors fail, its associated valve 25 shuts, thereby permitting the pressure in the plenum chamber 35 to be maintained.

The arrangement of controls may be seen schematically in Figure 8. The outboard power units 15, 16 drive controllable pitch constant speed propellers 19 and have power throttles 39, 40 each connected, through differential assemblies 41, 42, with throttle control levers 43, 44 respectively. Also connected with the differentials 41, 42 are linkages indicated at 45, 46 connected at their other ends with a rudder bar 47 pivotally mounted at 48. Operation of the rudder bar 47 enables the power throttles 39, 40 to be operated independently of the throttle control levers 43, 44.

The air valves 24 are interconnected by a linkage indicated at 49 and controlled by an air supply valve control lever 50. The lever 50 is interconnected with the throttle control levers 43, 44 in a manner which will become apparent on reference to subsequent figures.

The centre turbine 26 has a power throttle 51 connected by a linkage 52 with a throttle control lever 53. This has no interconnection with any of the other controls.

Figures 9 to 19 show the control levers in different positions, the structure being shown in somewhat greater detail. In Figures 9, 12, 14, 16 and 18 the control levers are shown in side elevation pivoted about a common axis 54, this axis also being indicated schematically in Figure 8 in broken lines. As in these figures the outboard power unit throttle control levers 43, 44 move together, only the control lever 44 is shown.

The differential assembly 42 is shown in Figures 9 and 11. A link 55 from the control lever 44 actuates a lever arm 56 and through it a crown wheel 57, while the rudder bar linkage 46 actuates a similar lever arm 58 and crown wheel 59 on the opposite side of the differential assembly. Between these crown wheels is a carrier 60 carrying pinions 61, 62 and a lug 63 actuating a linkage 64 connected with and operating the power throttle 40 of the power unit 15.

The air supply valve control lever 50 is interconnected with the throttle control levers 43, 44 by means of a gate 65 and a gating bar 66, the operation of which will be apparent from Figures 10, 13, 15, 17 and 19.

The operation of the control levers in flight is as follows:

During hovering flight the levers are as shown in Figures 9 and 10. All the power units are running at equal throttle settings, giving only enough power at the propellers 19 to stabilize the aircraft at take-off. The remainder of the power from the outboard power units, controlled by the air valves 24, is available as pressure air to the rotor jets, and this, together with the full complement of air from the centre compressor 27, provides the required power for the rotor 11.

In the event of one power unit failing, sufficient power in the remainder is available to restore the required power to the rotor 11. This is accomplished by moving the throttle levers into the fully open position indicated in broken lines at 67.

The changeover from hovering to forward flight is achieved in three stages. In stage 1, the control lever 50 is moved to the position shown in Figures 12 and 13, the position of the throttle levers remaining unchanged. The power to the rotor 11 is decreased, and the power to the propellers 19 is increased sufficiently to give enough power for the required forward speed. At this stage the pilot may return to hovering if desired by returning the lever 50 to the position shown in Figure 9.

Figure 14:
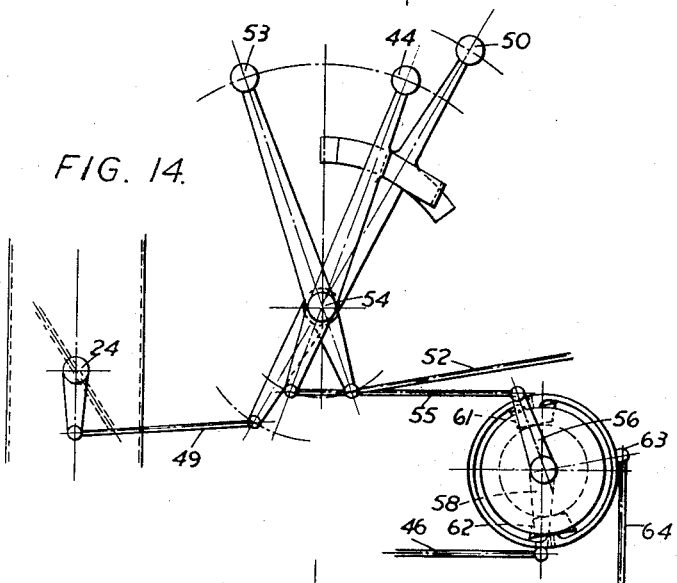
Figure 15:
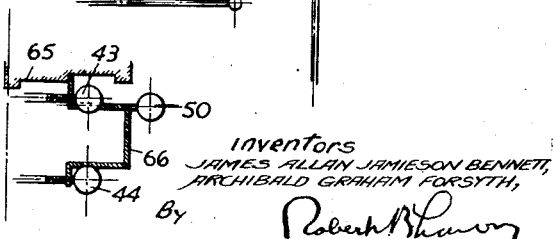

In stage 2, the centre throttle control lever 53 is moved to the fully closed position, as shown in Figures 14 and 15.

The outboard throttle control levers 43, 44 and the air supply valve control lever 50 are left unchanged. The aircraft is now operating on the outboard power units only, the propellers 19 being maintained at the required forward flight power, but the power available to the rotor 11 being now only from the outboard power units.

In stage 3, the lever 50 is moved through the gate 65 to the forward stop, as shown in Figures 16 and 17. Simultaneously the gating bar 66 interconnects the lever 50 with the outboard throttle control levers 43, 44, thus progressively reducing the power and cutting off the air supply to the rotor 11 until the condition is reached (see Figures 16 and 17) of forward flight with the required propeller power, and with the rotor 11 in autorotation.

The changeover from forward flight to hovering may be accomplished in either of two ways. Either (a) by starting up the centre turbine, pulling the lever 50 on to the back stop to supply air to the rotor 11, and opening up the engines, or (b) pulling the lever 50 on to the back stop and opening the outboard throttles.

Figures 18 and 19 show the controls closed.

Under all conditions of engine power the propellers 19 are maintained at constant revolutions through the medium of a known constant speed unit; however, the speed can be controlled if required by the addition of a further lever controlling the constant speed unit datum.

The centre throttle control lever 53 can be operated freely throughout its range, but, if desired, stops or gates could be provided to give interconnection with the air supply valve control lever 50.

By means not shown, the fuel to the rotor 11 is turned off and the ignition switched off when the air supply valve control lever 50 is passed through the gate 65.

We claim:

1. In an aircraft, a sustaining rotor having rotary wings radiating from a hub, at least two independent compressors, two propellers operable for forward propulsion, jet units on the tips of said rotary wings, said hub being provided with a distributor, feeding ducts to said distributor from each compressor and from said distributor to each of said jet units, and two gas turbines each driving one of said compressors and one of said propellers.

2. In a rotary wing aircraft, a sustaining rotor, comprising rotary wings, two variable pitch outboard propellers, and two power units each connected to one of said propellers, said power units being independent of mechanical transmission to the rotor and between each other, jets on the tips of the rotary wings, and compressor means, driven by said power units, air conduits from said compressor means to said jets and to said power units, and valve means in said conduits for selectively distributing the power from said power units between said propellers and said rotor, whereby said aircraft is capable of operating as a helicopter, gyroplane or capable of being flown employing the gyrodyne principle of distributing power between the rotor and propellers.

3. A rotary wing aircraft comprising a sustaining rotor, two stub wings having power units mounted at the outboard ends thereof, two propellers arranged for forward propulsion of the aircraft and driven by said power units, there being no mechanical power transmission mechanism between the power units and the rotor and no mechanical interconnection between the power units themselves, each of the power units including a turbo-driven air compressor having valved connection with jets mounted at the tips of the blades of the rotor, the valved connections being arranged to enable the output of the air compressors to be divisible in variable ratio between the jets at the tips of the blades and the power units, whereby a sufficient proportion of said output may be delivered to the jets at the tips of the rotary wings and drive the rotor for vertical flight, or the whole of said output may be delivered to the turbines to enable the propellers to be employed for forward flight, the rotor then being autorotative, or said output may be distributed in any other desired ratio between the jets at the tips of the blades and the turbines.

4. A rotary wing aircraft as claimed in claim 3 and means providing differential control of the pitch of said propellers and means providing differential throttle control of said power units, whereby control of the aircraft in yaw, independently of forward speed, may be obtained by said means providing differential control of the pitch of the propellers, and by said means providing differential throttle control of the separate power units driving the propellers.

5. A rotary wing aircraft as claimed in claim 3 and means for controlling the pitch of said propellers whereby, in the event of failure of either power unit, the pitch of the operative propeller may be reduced to give substantially zero thrust and the operative power unit may be utilized to provide air flow for the operation of jets at the tips of the rotary wings.

6. A rotary wing aircraft as claimed in claim 3, and constant speed governors connected with variable pitch control mechanism for the propeller blades so arranged that when the jets at the tips of the rotary wings are in use for vertical flight the propeller blades are set at substantially zero pitch and, when the flow to said jets is cut off gradually, and the flow to the turbines is increased, the pitch of the propeller blades is increased correspondingly until the desired change of power distribution is attained.

7. A rotary wing aircraft as claimed in claim 3, wherein the hub of the rotor is provided with an air distributor casing connected to said jets and arranged to be fed by said compressors.

8. A rotary wing aircraft comprising a fuselage, a sustaining rotor, having rotary wings radiating from a hub, attached to said fuselage, aerofoils of relatively short span extending from said fuselage, at least two independent compressors, at least two propellers operable for forward propulsion, jet reaction units at the tips of said rotary wings, said hub being provided with a distributor, feeding ducts to said distributor from each of said compressors and from said distributor to each of said jet reaction units, and at least two gas turbines each driving one of said compressors, and at least two of said turbines driving said propellers.

9. In an aircraft, a rotary wing, a jet on said wing for causing said wing to rotate by reaction, a plurality of air compressors, a plurality of power units each driving one of said compressors with no mechanical interconnection between the power units themselves, a plenum chamber connected to receive compressed air from all said compressors and to deliver said air to said jet, and an individual non-return valve interposed between each said compressor and said plenum chamber whereby, in the event of failure of one compressor, reverse airflow thereto does not occur.

10. In an aircraft, a rotary wing, reaction jet means on said wing for driving said wing, two air compressors connected to supply compressed air as working fluid to said jet means, power units with no mechanical connection therebetween, connected respectively to said compressors to drive same, and a propeller driven by one only of said power units.

JAMES ALLAN JAMIESON BENNETT.
ARCHIBALD GRAHAM FORSYTH.

References Cited in the file of this patent

UNITED STATES PATENTS

| Number | Name | Date |
|---|---|---|
| 2,483,480 | Stalker | Oct. 4, 1949 |
| 2,518,498 | Schulte | Aug. 15, 1950 |
| 2,540,190 | Doblhoff | Feb. 6, 1951 |

FOREIGN PATENTS

| Number | Country | Date |
|---|---|---|
| 259,295 | Switzerland | June 16, 1949 |